United States Patent [19]

Yamazaki et al.

[11] Patent Number: 5,162,395

[45] Date of Patent: Nov. 10, 1992

[54] RUBBER COMPOSITION

[75] Inventors: Hirotaka Yamazaki; Yasunori Fukuta; Yoshihide Fukahori, all of Tokyo, Japan

[73] Assignee: Bridgestone Corporation, Tokyo, Japan

[21] Appl. No.: 658,302

[22] Filed: Feb. 20, 1991

[30] Foreign Application Priority Data

Mar. 1, 1990 [JP] Japan .................................. 2-49850

[51] Int. Cl.$^5$ .................................. C08K 9/00
[52] U.S. Cl. .................................. 523/209; 523/150; 523/152; 523/153; 523/210; 523/212; 523/213; 523/214; 523/216; 523/217; 524/440
[58] Field of Search ............... 523/150–153, 523/209, 210, 212, 213, 214, 216, 217; 524/440

[56] References Cited

U.S. PATENT DOCUMENTS

| | | | |
|---|---|---|---|
| 2,011,496 | 8/1935 | Lüchinger | 523/150 |
| 2,143,897 | 1/1939 | Oriola | 523/150 |
| 2,793,136 | 5/1957 | Root | 523/150 |
| 3,573,155 | 3/1971 | Mitchell | 523/150 |
| 3,878,147 | 4/1975 | Craven | 523/150 |

FOREIGN PATENT DOCUMENTS

| | | | |
|---|---|---|---|
| 2447614 | 4/1975 | Fed. Rep. of Germany | 523/150 |
| 46-31732 | 9/1971 | Japan . | |
| 51-147803 | 12/1976 | Japan . | |
| 56-52057 | 12/1981 | Japan . | |
| 63-89547 | 4/1988 | Japan . | |

*Primary Examiner*—Paul R. Michl
*Assistant Examiner*—Edward J. Cain
*Attorney, Agent, or Firm*—Kanesaka and Takeuchi

[57] ABSTRACT

A rubber composition which contains, in a matrix consisting mainly of rubber, irregularly shaped particles having high hardness, and subjected to surface treatment for improving their affinity for the matrix, or their adhesion to it.

7 Claims, 1 Drawing Sheet

RUBBER COMPOSITION

BACKGROUND OF THE INVENTION

1. Field of the Invention

This invention relates to a rubber composition which is particularly suitable for making the treads of tires and the soles of shoes.

2. Description of the Prior Art

The treads of tires on the wheels of a vehicle have a by far smaller friction force on a frozen road surface than on a normal dry road surface. Spiked tires or tire chains are used to improve the friction of the treads on a frozen road surface and thereby the safety of the vehicle which is driven on such a surface. Both the spiked tires and the tire chains, however, damage the road surface when the vehicle is caused to make a sharp turn, or a sudden start or stop. The damaged road surface forms dust which is scattered by wind when the surface has dried. Moreover, the spikes or chains on the tires make noise as they hit the road surface when the vehicle is running.

A number of technical approaches have recently been made to improve the friction on ice of the rubber which is used for making the treads of tires. They are classified into two main groups of methods. One of the first group of methods comprises foaming rubber to form closed cells in it, as proposed in Japanese patent application laid open to the public under No. 89547/1988. This method gives rubber having a surface covered with a multiplicity of pores which exert a sucking effect on ice, exhibits a water-absorbing effect, and undergo a microscopic behavior causing the loss of energy, so that the rubber surface may produce a large amount of friction on ice. Studless tires formed from such rubber are commercially available.

Another attempt belonging to the first group that has been proposed comprises incorporating various kinds of materials into rubber, so that when the tires formed from such rubber and mounted on a vehicle are rotating, the incorporated material may drop from the tires and thereby form pores in the surfaces thereof. Sand, chaff, or other natural materials are, for example, incorporated into rubber. This method also gives a tread surface which exhibits a high degree of friction on ice.

The second group of methods comprises incorporating various kinds of materials having a high degree of hardness into rubber, so that the incorporated material may exert a scratching effect on ice to enable a tread surface to exhibit a high degree of friction on a frozen road, as proposed in Japanese patent publication No. 31732/1971, Japanese patent application laid open to the public under No. 147803/1976 and Japanese patent publication No. 52057/1981. These methods are definitely based on a mechanism which differs from that on which the first group of methods relies. As a matter of fact, it is often likely that the incorporation of a greater amount of any such material may give rubber exhibiting a higher degree of friction on ice.

It is, however, to be noted that not only friction, but also high wear resistance is essentially required of any rubber used to make a tread, or anything else that will be brought into frequent contact with a road surface. No rubber exhibiting a high degree of friction on ice is suitable for making a practically acceptable tread, if it is low in wear resistance. None of the known methods as hereinabove described can, however, produce rubber exhibiting both a high degree of friction on ice and a high degree of wear resistance. Rubber having both of the two properties is very difficult to obtain even by the incorporation of any hard material as hereinabove mentioned. It has hitherto been believed that the two properties as hereinabove stated cannot be attained at the same time.

SUMMARY OF THE INVENTION

Under these circumstances, it is an object of this invention to provide a rubber composition which exhibits both a high degree of friction on ice and a high degree of wear resistance.

This object is attained by a rubber composition which comprises a mixture of materials forming a matrix of rubber, and irregularly shaped particles having high hardness and subjected to surface treatment for improving their affinity for the matrix.

Although the rubber composition of this invention is prepared by a method which may basically appear to belong to the second group as hereinbefore described, the method can definitely be distinguished therefrom by the surface treatment of the hard particles employed for reinforcing the rubber matrix.

It is well known that the theoretical achievement of any function, particularly of the dynamic nature, by a mixture of materials calls for the complete adhesion of its components to one another. It is no exaggeration to say that the degree of their adhesion determines the properties of the mixture.

Referring particularly to the composition of the type to which this invention pertains, therefore, the adhesion of the hard particles to the rubber matrix is very important on both the frictional property and wear resistance of the composition.

According to this invention, the improved adhesion of the particles to the matrix is achieved by the surface treatment thereof, and in the event that no satisfactory improvement should be achieved by the surface treatment, the particles are irregularly shaped so as to be physically held in the matrix by an "anchor" effect and thereby attain a satisfactorily improved adhesion to it.

The rubber composition of this invention is a very good material which can be used to make, for example, the treads of tires or the soles of shoes.

Other features and advantages of this invention will be apparent from the following description and the accompanying drawing.

DETAILED DESCRIPTION OF THE INVENTION

The rubber composition of this invention comprises a matrix of rubber, and irregularly shaped particles having high hardness and subjected to surface treatment for improving their affinity for the matrix.

The particles preferably have a Vickers hardness number ($H_v$) of at least 20. They may be of an inorganic or organic material. More specifically, it is possible to use a wide range of materials including ceramics such as $Al_2O_3$, $ZnO$, $TiO_2$, $SiC$, $SiO_2$, ferrites, zirconia and $MgO$; metals such as Fe, Co, Al, Ca, Mg, Na, Cu and Cr, or alloys thereof such as brass and stainless steels, or compounds thereof such as nitrides, oxides, hydroxides, carbonates, silicates, and sulfates; glass, carbon, carborundum, micas, zeolites, kaolin, asbestos, montmorillonite, bentonite, graphite, silica, sand, silica sand, wood, Syras balloon (one kind of foamed volcanic glass), coal, rock and stone; and plastics.

Examples of suitable plastics are thermoplastics such as polystyrene, polyethylene, polypropylene, ABS, polyvinyl chloride, polymethyl methacrylate, polycarbonate, polyacetal, nylon, chlorinated polyether, polytetrafluoroethylene, acetyl cellulose and ethyl cellulose; thermosetting plastics such as phenolic, resorcinol, urea, unsaturated polyester, epoxy, alkyd and melamine resins; and, modified, blended or polyblended (polymer-alloyed) resins aforementioned.

It is preferable to use particles having a Vickers hardness ($H_v$) of at least 20, more preferably at least 30, still more preferably at least 50, and most preferably at least 500.

It is preferable to use particles having a size which is over 1000 mesh, but under 50 mesh (i.e., 50 to 1000 mesh), more preferably a size of 60 to 800 mesh, and still more preferably a size of 100 to 500 mesh.

The particles may be solid or hollow, or foamed (or porous). They are not spherical, but are irregularly shaped. It is necessary to use irregularly shaped particles, so that they may adhere more strongly to the rubber matrix and may also scratch a frozen surface more effectively.

Figure 1:
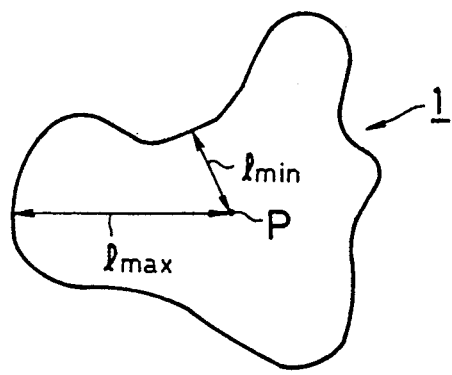
FIG. 1 is a sectional view of a particle showing the irregularity R of its shape.

The irregularity in shape of the particles which are employed in the composition of this invention is defined by the following formula:

$$\text{Irregularity } (R) = \frac{\text{Maximum radius of a particle } (l_{max})}{\text{Minimum radius thereof } (l_{min})}$$

where lmax is the maximum distance between the surface of the particle 1 and its center P of gravity, and lmin is the minimum distance therebetween, as shown in FIG. 1.

The irregularity R in shape of the particles is preferably in the range shown as $R \geq 1.10$, more preferably $R \geq 1.20$, and still more preferably $R \geq 1.30$.

The surfaces of the irregularly shaped particles are treated so as to have an improved affinity for the rubber matrix. A variety of methods can be employed for that purpose. According to one method, the particles are coated with an adhesive which adheres strongly to both the particles and the matrix. According to another method, the particles are coated with brass, copper or cobalt by plating, plasmatic evaporation, or sputtering. In this case, a still higher adhesive strength is obtained if the matrix has a high sulfur content.

It is also effective to coat the particles with an adhesive rubber material. The material may be equal in composition to the matrix, or may be different from it. In the latter case, the material can be prepared by employing as its rubber component an ordinary solid rubber, a latex of emulsion thereof, or a thermoplastic rubber. If the material has a high viscosity, it can be dissolved in a solvent to form a solution which can be applied to the particles.

Moreover, it is very effective to coat the particles with a resin. A variety of resins can effectively be used. They include polyesters. hydroxylated polyesters, polyether polyols, polycaprolactone polyols, hydroxylated polyester polyisocyanates, epoxy resins, acrylic resins, ethylene-vinyl acetate copolymers, phenolic resins, tolylene diisocyanate, glycidyl ether of bisphenol A, polysiloxanes, silicone resins, PVA (polyvinyl alcohols), PMMA (polymethyl methacrylates), polyvinyl acetate, polyacrylic acids, pitch, methyl methacrylate, and styrene.

It is also effective to coat the particles with polybornene, thermoplastic rubber, or any other resin having shape retaining property. This type of resin holds the particles firmly at a freezing temperature, and softens at an elevated temperature to exhibit good affinity for the matrix to achieve a greatly improved result.

The surface treatment of the particles with a silane, titanate, chromium, or aluminum coupling agent, or polyalkylene oxides is also effective for improving their adhesion to the matrix.

The coating which is formed on the surfaces of the particles by any of a variety of materials as hereinabove mentioned, has a thickness (l) which is preferably smaller than the diameter of the particles ($l_0$; the diameter of a sphere which is equal in volume to the average particles), or represented as $l \leq l_0$, or more preferably $l \leq \frac{1}{2}l_0$, or still more preferably $l \leq \frac{1}{4}l_0$.

The surface treatment of the particles may be carried out by employing one of the methods as hereinabove described, or two or more thereof, so that in the latter case, the particles may be coated with two or more materials.

The composition of this invention may contain one kind of particles, or two or more kinds of particles which differ from one another in material, size, shape, or the coating formed thereon.

It is beneficial from the standpoint of friction on ice to increase the proportion of the particles in the composition, but its wear resistance drops sharply as the proportion of the particles is increased. Therefore, the composition of this invention preferably contains 2 to 20% by volume ($V_f$) of particles. A $V_f$ range of 3 to 16% is more preferable, and a range of 4 to 13% is most preferable.

There is no particular limitation to the materials forming the matrix in the composition of this invention. The matrix may comprise an ordinary rubber composition which can be prepared by adding ordinary additives, such as a filler, oil and a vulcanizing agent, to rubber. The composition of this invention can be manufactured if a kneaded mixture of an ordinary rubber composition and the particles as hereinabove defined is vulcanized.

The method which is employed in accordance with this invention to achieve a high degree of friction may be classified into the second group of methods, rather than the first group, as hereinbefore stated. This invention does, however, not preclude the use in combination of the first and second groups of methods which are based on different mechanisms. The use in combination thereof is, on the other hand, rather effective. When preparing the composition of this invention, it is effective to form pores in the matrix by foaming it, or incorporating any material failing to adhere well to it, if the pores do not have any adverse effect on the wear resistance of the composition. The pores are formed after the hard irregularly shaped particles have been incorporated into the matrix.

The invention will now be described more specifically with reference to several examples thereof and comparative examples.

EXAMPLES 1 TO 4 AND COMPARATIVE EXAMPLES 1 TO 4

Rubber compositions were prepared by adding particles of materials as shown in TABLE 1 below, which had been subjected to surface treatment as shown in TABLE 1, in proportions as shown in TABLE 1 to a matrix having the composition shown below. The composition of COMPARATIVE EXAMPLE 1 did not contain any such particles, but consisted solely of the matrix. The coefficient of friction ($\mu$) on ice of the product of each example and the relative amount of its wear were determined by the methods as hereinafter described, respectively. The results are shown in TABLE 1.

| Composition of the Matrix (phr) | |
|---|---|
| Natural rubber (NR) | 100 |
| Carbon (HAF) | 60 |
| Stearic acid (StA) | 3 |
| Zinc oxide (ZnO) | 5 |
| Sulfur (S) | 1.5 |

Determination of Coefficient of Friction ($\mu$) on Ice

Figure 2:
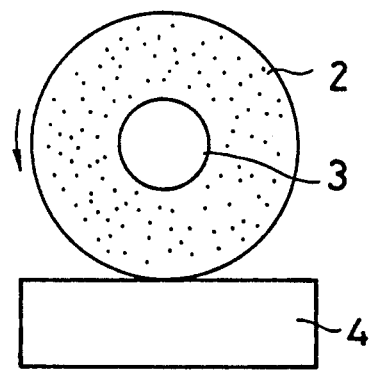
FIG. 2 is a diagrammatic illustration of a method employed for determining the coefficient of friction of a sample on ice.

A sample 2 of the product of each example was rotatably held against a fixed block of ice 4 by a bolt 3, and was rotated about the bolt 3, as shown in FIG. 2. The resulting force of friction was measured by a load cell, and the corresponding coefficient of dynamic friction, $\mu$ was calculated from it.

The measurement was carried out by holding each sample under a pressure of 5 kg/cm$^2$ against the ice and rotating it at a speed giving a peripheral velocity of 85 cm/sec. at the temperature of $-2°$ C. at which a thin film of water was formed on the surface of the ice and reduced the friction between the contacting surfaces to a minimum.

Determination of Relative Amount of Wear

The wear of each sample was tested by Lambourn abrasion tester BS903 at room temperature by holding the sample under a pressure of 7 kg/cm$^2$, employing a slip ratio of 100% and rotating it at a speed giving a peripheral velocity of 85 cm/sec. The results are shown in TABLE 1, in which the amount of wear which occurred to each sample, except that of COMPARATIVE EXAMPLE 1, is shown by the value relative to the amount of wear on the sample of COMPARATIVE EXAMPLE 1 as taken to be 100.

Attention is drawn to TABLE 1. The product of COMPARATIVE EXAMPLE 1 consisting solely of the rubber matrix showed a coefficient of friction, $\mu$, on ice of 0.05. The product of EXAMPLE 1 of this invention contained 8.0% by volume of stainless steel particles which had been coated with an adhesive, and was superior in both the coefficient of friction on ice and wear resistance to the product of COMPARATIVE EXAMPLE 2 which was identical in composition to it, but in which the particles had not been given any surface treatment. The products of EXAMPLES 2 to 4 containing SiO$_2$ particles coated with different materials were also outstanding in both of the two properties. The product of COMPARATIVE EXAMPLE 3 was identical to the products of EXAMPLES 2 to 4, except that the particles had not been coated with any material, and was inferior in both of the properties. These results confirm that the surface treatment of the particles in the composition of this invention are very effective for improving the frictional property and wear resistance of the composition.

The product of COMPARATIVE EXAMPLE 4 contained iron particles coated with cobalt by plating, but was low in both of the properties, apparently because the particles had a very low degree of irregularity in shape and were almost spherical.

It is, therefore, obvious from the results of these examples that the use of satisfactorily irregularly shaped and surface treated particles of a hard material is essential for making a rubber composition which is satisfactory in both of frictional property and wear resistance, as proposed by this invention.

What is claimed is:

1. A rubber composition comprising a matrix of rubber, irregularly shaped particles having high hardness, and a material selected from the group consisting of brass, copper and cobalt, said material being coated onto said particles by a method selected from the group consisting of plating, plasmatic evaporation and sputtering for providing surface treatment for improving affinity of said particles for said matrix, said rubber composition containing 2 to 20% by volume of said particles, said particle having a size of 50 to 1000 mesh and irregularity in shape, R, of at least 1.10, as defined by the following formula:

$$R = \frac{\text{Maximum radius of particle } (l\text{max})}{\text{Minimum radius thereof } (l\text{min})}$$

TABLE 1

| | Example | Example of the invention | | | | Comparative Example | | | |
|---|---|---|---|---|---|---|---|---|---|
| | | 1 | 2 | 3 | 4 | 1 | 2 | 3 | 4 |
| Composition (part) | Material | Stainless steel | SiO$_2$ | SiO$_2$ | SiO$_2$ | — | Stainless steel | SiO$_2$ | Iron |
| | Vickers hardness (Hv) | 150 | 1100 | 1100 | 1100 | — | 150 | 1100 | 200 |
| | Size (mesh) | 100~300 | 150~300 | 150~300 | 150~300 | — | 100~300 | 150~300 | 90~100 |
| | Shape irregularity (R) | 2.5 | 2.1 | 2.1 | 2.1 | — | 2.5 | 2.1 | 1.02 |
| Surface treatment | Coating material | Adhesive | Rubber | Polyester | Epoxy resin | — | — | — | Cobalt |
| | Coating thickness (l/l$_0$) | 1/10 | ⅛ | ⅛ | ⅛ | — | — | — | 1/20 |
| Proportion by volume of hard particles (V$_f$(%)) | | 8.0 | 6.0 | 6.0 | 6.0 | — | 8.0 | 6.0 | 10.0 |
| Coefficient of friction on ice ($\mu$) | | 0.105 | 0.095 | 0.095 | 0.095 | 0.05 | 0.065 | 0.065 | 0.070 |
| Relative amount of friction | | 130 | 140 | 128 | 145 | 100 | 200 | 280 | 180 | wherein said maximum radius is a maximum distance between a surface of said particle and a center of gravity thereof, and said minimum radius is a minimum distance between the surface of said particle and said center of gravity, said rubber composition providing good frictional property relative to ice and wear resistance.

2. A rubber composition as set forth in claim 1, wherein said particles are covered with a coating formed by said surface treatment, and having a thickness which is smaller than the diameter of said particles.

3. A rubber composition as set forth in claim 1, wherein coefficient of friction on ice is over 0.095, and relative amount of friction of the rubber composition containing the matrix of rubber and the particles is greater than that containing only the matrix of rubber.

4. A rubber composition as set forth in claim 1, wherein said particles have a Vickers hardness ($H_v$) of at least 20.

5. A rubber composition as set forth in claim 1, wherein said particles are of a material selected from the group consisting of ceramics, metals, alloys, metal compositions, and plastics.

6. A rubber composition as set forth in claim 5, wherein said metal compositions are of a material selected from the group consisting of metal nitrides, metal oxides, metal hydroxides, metal carbonates, metal silicates and metal sulfates.

7. A rubber composition as set forth in claim 1, wherein said particles are of a material selected from the group consisting of glass, carbon, carborundum, micas, zeolites, kaolin, asbestos, montmorillonite, bentonite, graphite, silica, sand, silica sand, wood, Syras balloon, coal, rock and stone.

* * * * *